(12) United States Patent
Corradini

(10) Patent No.: US 7,955,148 B2
(45) Date of Patent: Jun. 7, 2011

(54) HYDROELECTRIC TURBINE-BASED POWER-GENERATING SYSTEM FOR VESSELS AND SUBMARINES

(76) Inventor: Martin Eugenio Corradini, Mar Del Plata (AR)

( * ) Notice: Subject to any disclaimer, the term of this patent is extended or adjusted under 35 U.S.C. 154(b) by 0 days.

(21) Appl. No.: 12/322,621

(22) Filed: Feb. 5, 2009

(65) Prior Publication Data

US 2010/0090467 A1    Apr. 15, 2010

(30) Foreign Application Priority Data

Oct. 15, 2008   (UY) .......................................... 31.395

(51) Int. Cl.
*B63H 21/17*        (2006.01)
(52) U.S. Cl. ................. 440/6; 290/43; 290/54
(58) Field of Classification Search ........ 440/6; 290/42, 290/43, 44, 52, 53, 54, 55; 415/916
See application file for complete search history.

(56) References Cited

U.S. PATENT DOCUMENTS

| | | | | |
|---|---|---|---|---|
| 4,149,092 A | * | 4/1979 | Cros | 290/54 |
| 5,394,695 A | * | 3/1995 | Sieber | 290/53 |
| 6,388,342 B1 | * | 5/2002 | Vetterick et al. | 290/53 |

FOREIGN PATENT DOCUMENTS

| | | | |
|---|---|---|---|
| EP | 1849999 A2 | * | 10/2007 |
| GB | 2437743 A | * | 11/2007 |

* cited by examiner

*Primary Examiner* — Lars A Olson
(74) *Attorney, Agent, or Firm* — Lowe Hauptman Ham & Berner LLP

(57) ABSTRACT

Power-generating system based on successive hydroelectric turbines ($f_1^N$) located parallel to the submerged section of the hull of vessels and/or submarines (generating line $f_1^N$), at the point or points of greatest channeling of the water flow produced naturally during navigation. Each turbine is preceded by a propeller ($f_1^N$), whose function is to increase the speed of the water flow powering the turbine when the vessel and/or submarine is in motion, and to generate the power flow when the vessel and/or submarine is stationary (anchored or moored).

14 Claims, 2 Drawing Sheets

HYDROELECTRIC TURBINE-BASED POWER-GENERATING SYSTEM FOR VESSELS AND SUBMARINES

BACKGROUND

Existing alternative energy systems are characterized by the use of solar energy, captured by means of panels or sails, which can only provide a small part of the energy needed to power a vessel.

To the knowledge of the inventor, never before has a turbine-based power-generating system been used to supply power to vessels and submarines.

DESCRIPTION OF THE DRAWINGS

One or more embodiments are illustrated by way of example, and not by limitation, in the figures of the accompanying drawings, wherein elements having the same reference numeral designations represent like elements throughout and wherein.

DETAILED DESCRIPTION

Figures 1, 2:
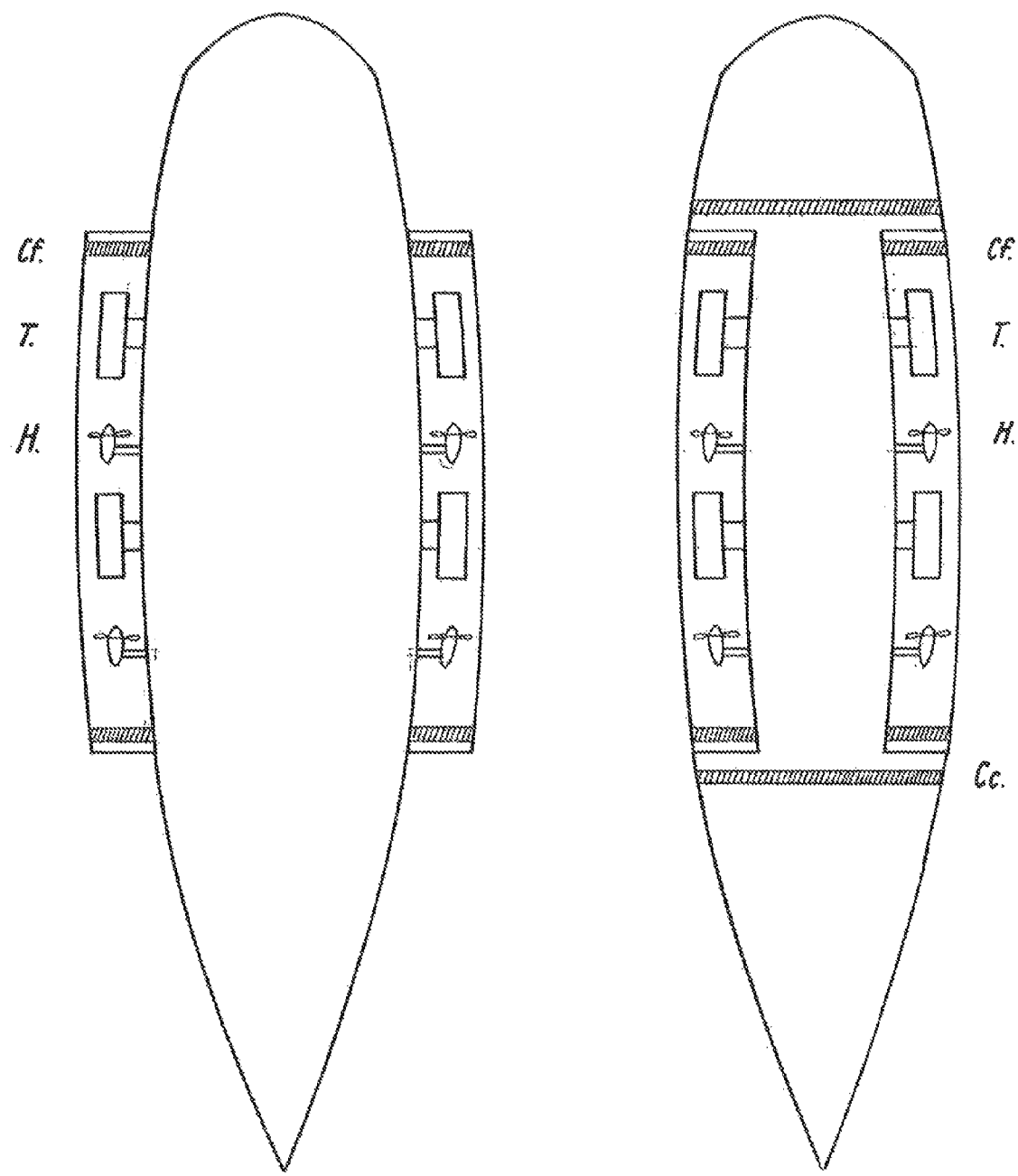
FIG. 1 is a Superior View (external generating lines) of an embodiment.
FIG. 2 is a Superior View (internal generating lines) of an embodiment, and wherein Cf is a Cross section generating line, Cc is a Cross section Deck, T is a Turbine, and H is a Propeller.
Figure 3:
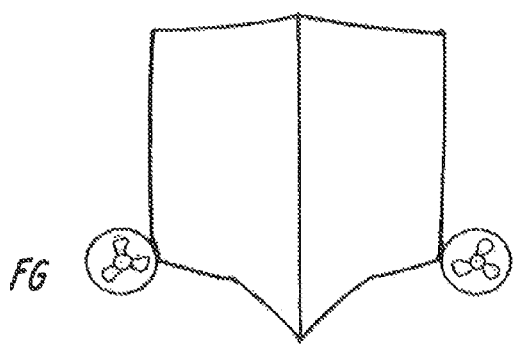
FIG. 3 is a Front View (external generating lines) of the FIG. 1 embodiment.
Figure 4:
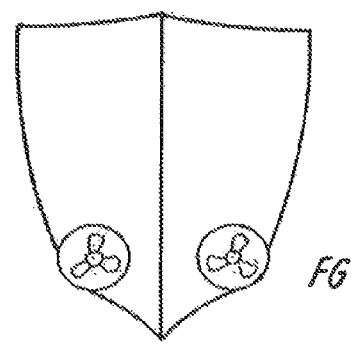
FIG. 4 is a Front View (internal generating lines) of the FIG. 2 embodiment.

The drawings have been simplified for a better understanding of the system, emphasizing on the parts and components that are fundamental for its operation.

One or more embodiments of the present invention comprise power-generating systems based on successive hydroelectric turbines ($f_1^N$) located parallel to the submerged section of the hull of vessels and/or submarines (generating line $f_1^N$), at the point or points of greatest channeling of the water flow produced naturally during navigation. In at least some embodiments, each turbine is preceded by a propeller ($f_1^N$), whose function is to increase the speed of the water flow powering the turbine when the vessel and/or submarine is in motion, and to generate the power flow when the vessel and/or submarine is stationary (anchored or moored).

Multiple turbine designs are applicable to the system. Therefore, the drawings have been simplified for a better understanding of the system. The specifications and drawings correspond to one or more embodiments of independent invention patent applications.

Given the multiplicity of possible hull designs and arrangement of lines, the drawings only exhibit one of many possible combinations.

Turbine-based power-generating system by means of hydroelectric turbines, either activated or powered by propellers (depending on the condition of vessel) lined up (necessary quantity) along the submerged section (lateral or lower) of the hull of vessels and/or submarines.

The lines are randomly located along the submerged section of the hull of vessels and submarines. As described herein, in at least some embodiments the lines are not randomly located. The lines may be made up of turbines only, in at least some embodiments, and they are randomly located within the line.

The system channels the water flow naturally produced by the submerged section of the hull (upper and lower-lateral parts or any combination thereof) during sailing, and generates the energy flow while the vessel is anchored or moored by virtue of propellers located before the turbines within the generating line.

The cylindrical-shaped generating line is embedded in the hull (facing inwards or outwards, depending on vessel type) and makes use of a propeller-turbine design or of independent turbines.

The system generates power with the use of hydroelectric turbines. When the vessel is in motion, the water flow, which goes through the generating lines naturally, is boosted (in at least some embodiments) by propellers activated by electric engines (achieving a faster water flow speed and thus an increase in power generation). When the vessels and/or submarines are anchored or moored, the propellers generate the water flow that activates the turbines, thus allowing for continuous generation of power.

The propeller-turbine groups are located in submerged lines (additional lines may be installed on the hull of a submarine, and they will appear above the floating line) along the lateral-lower (or combinations) side of the hull of vessels and/or submarines (the latter will allow for the installation of an upper line). The number of lines, which will be placed one next to the other or one over the other in the area of greatest water-flow channeling, will be determined by the power-generation requirements. Each line will have as many propellers-turbines as necessary.

The lines may be located inside or outside the natural limit of the hull, depending on the type of vessel and/or submarine (facing inwards or outwards).

Because of the lack of precedents, a new design for both generating turbines and propellers is necessary. Meant to increase or generate the water flow needed to activate the turbines, the propellers will be especially designed to route the water flow more efficiently towards the turbine, without the need to generate an exaggerated push force.

Existing hull designs as well as the transformers and batteries (corresponding to independent invention patent applications) for both vessels and/or submarines have to be adapted for system compatibility.

The system is applicable to every type of vessel (cruise ships, boats, ships, yachts, fishing boats, aircraft carriers, battleships, etc.) And submarines, and it provides power uninterruptedly for the operation of the vessels, allowing for unlimited autonomy.

The system, in at least some embodiments, aims at obtaining an uninterrupted generation of power and an unlimited performance, doing without the need for recharges or the use of fuel.

In at least some embodiments, the system produces no polluting emissions.

The system is believed to be absolutely innovating. To the knowledge of the inventor, never before has hydroelectric power been used to supply power to vessels and/or submarines and render them self-sufficient. No existing turbine or propeller design (corresponding to independent invention patent applications) is adequate to be used with at least some embodiments of this system. Hull design for both vessels and submarines will have to be adapted for system compatibility with one or more embodiments.

The system channels the water flow naturally produced by the submerged section of the hull (upper and lower-lateral parts or any combination thereof) during sailing, and generates the energy flow while the vessel is anchored or moored by virtue of propellers located before the turbines within the generating line. The cylindrical-shaped generating line is embedded in the hull (facing inwards or outwards, depending on vessel type). The turbines, preceded by the propellers, are located inside the generating line. Alternatively, the lines may be composed of turbines only. Lines are randomly distributed.

Designed for both vessels and submarines, the system possesses hydroelectric generation turbines either powered or activated by propellers (depending on the condition of vessel), placed parallel to the hull and lined up along its submerged section (upper and lower-lateral parts or any combination thereof), in the area of greatest water-flow channeling. Propellers-turbines (to be installed in that order, unless the vessel requires it otherwise) will be successively lined up within the generating lines, which may be installed in the hull facing either inwards or outwards, depending on the type of vessel or submarine, in as many lines as necessary (one over the other, one next to the other, or at random).

In at least some embodiments, neither vessels nor submarines will require any fuel other than the amount needed to start at least one propeller. They will be self-sufficient owing to the power generated by the turbines. Requiring no refueling whatsoever, the system will allow for navigating unlimited distances.

The system, in at least some embodiments, produces no polluting emissions and it does not require refueling.

It will be readily seen by one of ordinary skill in the art that the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

What is claimed is:

1. A hydroelectric turbine-based power-generating system for vessels, comprising:
   at least one generating turbine arranged along a submerged section of a vessel and aligned to generate power responsive to a flow of water along the submerged section, and
   at least one propeller placed before each turbine, the propeller arranged to generate an auxiliary water flow for starting the at least one turbine when the vessel is anchored and powering the vessel in motion.

2. The power-generating system as claimed in claim 1, the at least one generating turbine generates power based on water flow produced by the submerged section of a hull of the vessel.

3. The power-generating system as claimed in claim 1, further comprising more than one generating turbine arranged along the submerged section of the vessel, each aligned to generate power responsive to the flow of water along the submerged section.

4. The power-generating system as claimed in claim 3, generating lines comprising more than one generating turbine being embedded in a hull of the vessel.

5. The power-generating system as claimed in claim 4, wherein at least one of the more than one generating turbines faces inward of a hull of the vessel.

6. The power-generating system as claimed in claim 4, wherein at least one of the more than one generating turbines faces outward of a hull of the vessel.

7. The power-generating system as claimed in claim 3, the more than one generating turbines arranged in succession.

8. The power-generating system as claimed in claim 7, the succession of more than one generating turbines being linear.

9. The power-generating system as claimed in claim 3, the more than one generating turbines linearly arranged along the submerged section.

10. The power-generating system as claimed in claim 1, the at least one generating turbine placed freely on a surface of a hull of the vessel.

11. The power-generating system as claimed in claim 1, further comprising at least one additional generating turbine for generating power arranged to be above flotation line upon surfacing of the vessel.

12. The power-generating system as claimed in claim 1, comprising a random distribution of: generating turbine and propeller.

13. The power-generating system as claimed in claim 1, the vessel being a submarine or an amphibious vehicle.

14. The power-generating system as claimed in claim 1, wherein the submerged section is below a water line of the vessel during operation of the vessel.

* * * * *